United States Patent
Miyazaki

(10) Patent No.: US 8,800,621 B2
(45) Date of Patent: Aug. 12, 2014

(54) RUBBER COMPOSITION AND TIRE

(75) Inventor: Tatsuya Miyazaki, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 639 days.

(21) Appl. No.: 12/511,874

(22) Filed: Jul. 29, 2009

(65) Prior Publication Data

US 2010/0108213 A1 May 6, 2010

(30) Foreign Application Priority Data

Nov. 5, 2008 (JP) .................................. 2008-284746

(51) Int. Cl.
*B60C 1/00* (2006.01)
*C08L 7/00* (2006.01)
*C08L 21/00* (2006.01)
*C08L 15/00* (2006.01)
*C08L 19/00* (2006.01)

(52) U.S. Cl.
CPC . *C08L 7/00* (2013.01); *C08L 15/00* (2013.01); *B60C 1/00* (2013.01); *B60C 1/0016* (2013.04); *B60C 1/0041* (2013.04); *C08L 21/00* (2013.01); *C08L 2205/03* (2013.01); *C08L 19/006* (2013.01)
USPC .......................... 152/209.5; 524/526; 525/236

(58) Field of Classification Search
USPC .......................................... 524/526; 525/236
See application file for complete search history.

(56) References Cited

U.S. PATENT DOCUMENTS

| | | | |
|---|---|---|---|
| 2003/0015272 A1* | 1/2003 | Teratani et al. ............... | 152/406 |
| 2005/0171264 A1 | 8/2005 | Simonot et al. | |
| 2006/0094825 A1* | 5/2006 | Miyazaki ...................... | 525/236 |
| 2008/0009570 A1* | 1/2008 | Miyazaki ....................... | 524/89 |
| 2008/0095696 A1* | 4/2008 | Matsushima ............... | 423/449.1 |
| 2008/0169053 A1* | 7/2008 | Nakamura ................. | 152/209.5 |

FOREIGN PATENT DOCUMENTS

| | | |
|---|---|---|
| EP | 1 207 054 A1 | 5/2002 |
| EP | 1876203 A2 | 1/2008 |
| JP | 2001-114938 A | 4/2001 |
| JP | 2001-158836 A | 6/2001 |
| JP | 2004-285294 A | 10/2004 |
| JP | 2007-262206 A | 10/2007 |
| JP | 2008-31427 A | 2/2008 |
| JP | 2008-38119 A | 2/2008 |
| WO | WO 2006/076629 A1 | 7/2006 |
| WO | WO 2009/072350 A1 | 6/2009 |

OTHER PUBLICATIONS

Machine translation of JP 2007262206 A.*
Office Action for corresponding Japanese Application No. 2008-284746 dated May 17, 2011.

* cited by examiner

*Primary Examiner* — Bijan Ahvazi
*Assistant Examiner* — Wenwen Cai
(74) *Attorney, Agent, or Firm* — Birch, Stewart, Kolasch & Birch, LLP

(57) ABSTRACT

The present invention has its object to provide a rubber composition excellent in low-exothermic property, breaking strength, and crack growth resistance, and a pneumatic tire including at least one of a base tread, a cushion, a carcass and a tie gum that are prepared using the rubber composition. The present invention relates to a rubber composition including: a rubber component which contains (a) 10 to 30% by mass of at least one of a butadiene rubber modified by a compound represented by the formula (1):

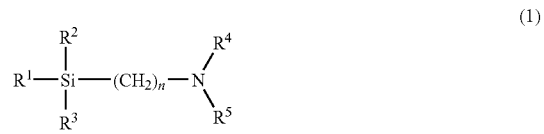

(1)

and a tin-modified polybutadiene rubber resulting from polymerization with a lithium initiator (b) 10 to 40% by mass of a modified styrene-butadiene rubber having a bound-styrene content of 21% by mass or less; and (c) 20 to 80% by mass of a diene rubber other than (a) and (b), and (d) 7 to 50 parts by mass of silica per 100 parts by mass of the rubber component.

6 Claims, No Drawings

RUBBER COMPOSITION AND TIRE

TECHNICAL FIELD

The present invention relates to a rubber composition and a pneumatic tire using the same.

BACKGROUND ART

Many studies have conventionally been made to reduce fuel consumption by reducing rolling resistance (expressed also as "by improving rolling resistance performance") of tires. Further reduction in fuel consumption has been more and more strongly required in recent years, and a rubber composition for tire components, such as a tire tread, is required to have more excellent low-exothermic property.

Known as a method for satisfying low-exothermic property of a rubber composition is a method in which an amount of a reinforcing filler is reduced. In such a case, however, hardness of the rubber composition decreases. On the other hand, a rubber composition desirably has a rubber hardness (Hs) of about 55 in order to maintain handling stability. Thus, it is important for the rubber composition containing the reinforcing filler in a decreased amount to inhibit decrease in Hs and to ensure proper breaking strength. The breaking strength, particularly elongation at break [EB (%)], relates to cut resistance and separation growth resistance. It is also important to improve crack growth resistance of rubber in order to prevent cracks on a groove of a tread from growing to cause burst owing to separating off.

For ensuring proper breaking strength of the rubber composition containing a reinforcing filler in a decreased amount, a method in which silica is substituted for carbon black, and a method in which a predetermined amount of natural rubber is blended may be contemplated. However, polymers containing natural rubber blended with butadiene rubber or the like easily cause reversion, which causes decrease in Hs and breaking strength. Even in the case of substitution by silica, polymers and silica are not strongly bound to one another, which causes insufficient reduction of heat generation. For example, in the case of using a BR with a tin-modified end as butadiene rubber, the BR with a tin-modified end is strongly bound to CO and COOH on the surface of carbon black, but it is not strongly bound to silica; thus, it is difficult to reduce heat generation. Furthermore, in the case of reducing a filler content, its dispersibility worsens rather than improves, which causes decrease in breaking strength and increase in heat generation.

Patent Document 1 discloses that a styrene-butadiene rubber that is modified by a predetermined organosilicon compound containing an alkoxy group improves rolling resistance and grip performance. However, there is still a room for improvement in order to satisfy all of low-exothermic property, breaking strength, and crack growth resistance of rubber. Furthermore, the document discloses, for the most part, a rubber with a styrene content of 20 to 30%, and there is no study on an optimal styrene content for each of compositions for a base tread, for coating a carcass, and for a tie gum of a tire.

Patent Document 1: JP 2001-114938 A

SUMMARY OF THE INVENTION

The present invention has its object to provide a rubber composition excellent in low-exothermic property, breaking strength, and crack growth resistance, and a pneumatic tire including at least one of a base tread, a cushion, a carcass and a tie gum that are prepared using the rubber composition.

The present invention relates to a rubber composition including:
a rubber component which contains
(a) 10 to 30% by mass of at least one of a butadiene rubber modified by a compound represented by the formula (1):

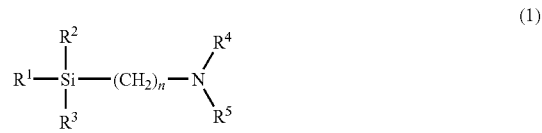

wherein $R^1$, $R^2$ and $R^3$ are the same or different and independently represent an alkyl group, an alkoxy group, a silyloxy group, an acetal group, a carboxyl group, a mercapto group, or a derivative thereof; $R^4$ and $R^5$ are the same or different and independently represent a hydrogen atom or an alkyl group; and n represents an integer, and
a tin-modified polybutadiene rubber resulting from polymerization with a lithium initiator and having a tin atom content of 50 to 3000 ppm, a vinyl-bond content of 5 to 50% by mass, and a molecular weight distribution (Mw/Mn) of 2 or less;
(b) 10 to 40% by mass of a modified styrene-butadiene rubber having a bound-styrene content of 21% by mass or less; and
(c) 20 to 80% by mass of a diene rubber other than (a) and (b), and
(d) 7 to 50 parts by mass of silica per 100 parts by mass of the rubber component.

The bound-styrene content in the modified styrene-butadiene rubber is desirably 15% by mass or less.

The modified styrene-butadiene rubber is desirably produced by modification with the compound represented by the formula (1).

The diene rubber is desirably at least one selected from the group consisting of natural rubbers, isoprene rubbers, and epoxydized natural rubbers.

The present invention also relates to a pneumatic tire including at least one of a base tread, a cushion, a carcass and a tie gum that are prepared using the rubber composition mentioned above.

According to one aspect of the present invention, the rubber composition of the present invention includes (a) at least one of a butadiene rubber modified by a specific compound and a specific tin-modified polybutadiene rubber, (b) a modified styrene-butadiene rubber with a bound-styrene content of 21% by mass or less, (c) other diene rubber and (d) silica, each in a predetermined amount. Thus, by using the rubber composition for a base tread, a cushion, a carcass, a tie gum or the like, it is possible to provide a pneumatic tire excellent in low-exothermic property, breaking strength, and crack growth resistance.

BEST MODE FOR CARRYING OUT THE INVENTION

The rubber composition of the present invention contains, as a rubber component, (a) at least one of a butadiene rubber modified by a compound represented by the formula (1) (S-modified BR) and a tin-modified polybutadiene rubber resulting from polymerization with a lithium initiator and having a tin atom content of 50 to 3000 ppm, a vinyl bond content of 5 to 50% by mass, and a molecular weight distribution (Mw/Mn) of 2 or less (Tin-modified BR); (b) a modified styrene-butadiene rubber having a bound-styrene content of 21% by mass or less (Modified SBR); and (c) a diene rubber other than (a) and (b), and further (d) silica. Use of the rubber composition makes it possible to provide a tire excellent in low-exothermic property and durability (breaking strength and crack growth resistance).

The S-modified BR (subcomponent (a)) is a butadiene rubber modified by a compound represented by the formula (1). Use of the S-modified BR contributes to decrease in Tg (glass transition temperature) of polymers and to formation of a strong bond between carbon black and the polymer. Furthermore, the S-modified BR forms a strong bond with silica, promotes dispersion of silica upon kneading, and thus improves EB. Suitably used as the S-modified BR is a BR having, at least, an end modified by a compound represented by the formula (1).

In the compound represented by the formula (1), $R^1$, $R^2$ and $R^3$ are the same or different and independently represent an alkyl group, an alkoxy group, a silyloxy group, an acetal group, a carboxyl group (—COOH), a mercapto group (—SH), or a derivative thereof. Examples of the alkyl group include $C_{1-4}$ alkyl groups such as a methyl group, an ethyl group, an n-propyl group, an isopropyl group, an n-butyl group, and a t-butyl group. Examples of the alkoxy group include $C_{1-8}$ (desirably $C_{1-6}$, and more desirably $C_{1-4}$) alkoxy groups such as a methoxy group, an ethoxy group, an n-propoxy group, an isopropoxy group, an n-butoxy group, and a t-butoxy group. The alkoxy group herein includes cycloalkoxy groups (for example, $C_{5-8}$ cycloalkoxy groups such as a cyclohexyloxy group), and aryloxy groups (for example, $C_{6-8}$ aryloxy groups such as a phenoxy group and a benzyloxy group).

Examples of the silyloxy group include silyloxy groups with substitution by a $C_{1-20}$ aliphatic group or aromatic group (for instance, a trimethylsilyloxy group, a triethylsilyloxy group, a triisopropylsilyloxy group, a diethylisopropylsilyloxy group, a t-butyldimethylsilyloxy group, a t-butyldiphenylsilyloxy group, a tribenzylsilyloxy group, a triphenylsilyloxy group, and a tri-p-xylylsilyloxy group).

Examples of the acetal group include groups represented by formulae such as —C(RR')—OR" or —O—C(RR')—OR". Examples of the groups represented by the former formula include a methoxymethyl group, an ethoxymethyl group, a propoxymethyl group, a butoxymethyl group, an isopropoxymethyl group, a t-butoxymethyl group, and a neopentyloxymethyl group. Examples of the groups represented by the latter formula include a methoxymethoxy group, an ethoxymethoxy group, a propoxymethoxy group, an i-propoxymethoxy group, an n-butoxymethoxy group, a t-butoxymethoxy group, an n-pentyloxymethoxy group, an n-hexyloxymethoxy group, a cyclopentyloxymethoxy group, and a cyclohexyloxymethoxy group.

Each of $R^1$, R and $R^3$ is desirably an alkoxy group. This makes it possible to achieve excellent low-exothermic property, breaking strength, and crack growth resistance.

With respect to the alkyl groups at R4 and $R^5$, the same alkyl groups as those mentioned above can be exemplified.

The n (integer) is desirably 1 to 5, and thereby excellent low-exothermic property, breaking strength, and crack growth resistance can be achieved together. The n is more desirably 2 to 4, and most desirably 3. If the n is 0, a difficulty may be caused in formation of a bond between a silicon atom and a nitrogen atom. If the n is 6 or more, the efficacy of the compound as a modifying agent may weaken.

Specific examples of the compound represented by the formula (1) include 3-aminopropyldimethylmethoxysilane, 3-aminopropylmethyldimethoxysilane, 3-aminopropylethyldimethoxysilane, 3-aminopropyltrimethoxysilane, 3-aminopropyldimethylethoxysilane, 3-aminopropylmethyldiethoxysilane, 3-aminopropyltriethoxysilane, 3-aminopropyldimethylbutoxysilane, 3-aminopropylmethyldibutoxysilane, dimethylaminomethyltrimethoxysilane, 2-dimethylaminoethyltrimethoxysilane, 3-dimethylaminopropyltrimethoxysilane, 4-dimethylaminobutyltrimethoxysilane, dimethylaminomethyldimethoxymethylsilane, 2-dimethylaminoethyldimethoxymethylsilane, 3-dimethylaminopropyldimethoxymethylsilane, 4-dimethylaminobutyldimethoxymethylsilane, dimethylaminomethyltriethoxysilane, 2-dimethylaminoethyltriethoxysilane, 3-dimethylaminopropyltriethoxysilane, 4-dimethylaminobutyltriethoxysilane, dimethylaminomethyldiethoxymethylsilane, 2-dimethylaminoethyldiethoxymethylsilane, 3-dimethylaminopropyldiethoxymethylsilane, 4-dimethylaminobutyldiethoxymethylsilane, diethylaminomethyltrimethoxysilane, 2-diethylaminoethyltrimethoxysilane, 3-diethylaminopropyltrimethoxysilane, 4-diethylaminobutyltrimethoxysilane, diethylaminomethyldimethoxymethylsilane, 2-diethylaminoethyldimethoxymethylsilane, 3-diethylaminopropyldimethoxymethylsilane, 4-diethylaminobutyldimethoxymethylsilane, diethylaminomethyltriethoxysilane, 2-diethylaminoethyltriethoxysilane, 3-diethylaminopropyltriethoxysilane, 4-diethylaminobutyltriethoxysilane, diethylaminomethyldiethoxymethylsilane, 2-diethylaminoethyldiethoxymethylsilane, 3-diethylaminopropyldiethoxymethylsilane, and 4-diethylaminobutyldiethoxymethylsilane. Each of these may be used singly, or two or more of these may be used in combination.

The vinyl content in the S-modified BR is desirably 35% by mass or less, more desirably 25% by mass or less, and still more desirably 20% by mass or less. If the vinyl content is more than 35% by mass, low-exothermic property tends to deteriorate. The lower limit of the vinyl content is not particularly restricted.

The vinyl content (1,2-bond content in butadiene unit) can be measured by an infrared absorption spectrum analysis.

With respect to a method for modifying butadiene rubber by the compound (modifying agent) represented by the formula (1), conventionally known methods such as the methods disclosed in, for example, JP H06-53768 B and JP H06-57767 B may be used. What is required for the modification method is, for example, to allow butadiene rubber to contact a modifying agent; there may be mentioned, for instance, a method in which butadiene rubber is polymerized and a modifying agent is added in a predetermined amount into the polymerized rubber solution, a method in which a modifying agent is added into a butadiene rubber solution to react with each other, and like methods.

The butadiene rubber (BR) to be modified is not particularly limited. Examples thereof include: BRs with a high cis-content such as BR1220 (produced by ZEON Corp.), BR130B, and BR150B (each produced by UBE INDUSTRIES, LTD.); and syndiotactic polybutadiene crystal-containing BRs such as VCR412 and VCR617 (each produced by UBE INDUSTRIES, LTD.).

The tin-modified BR (subcomponent (a)) may be obtained by polymerization of 1,3-butadiene with a lithium initiator, followed by addition of a tin compound. The tin-modified BR desirably has a tin-carbon bond at a molecular end thereof.

Use of the tin-modified BR contributes to decrease in Tg (glass transition temperature) of polymers, and to formation of a strong bond between carbon black and the polymer.

Examples of the lithium initiator include lithium-type compounds such as alkyl lithium, aryl lithium, allyl lithium, vinyl lithium, organotin lithium, and organonitrogen lithium compounds. Use of the lithium-type compound as the initiator makes it possible to produce a tin-modified BR with a high vinyl-content and low cis-content.

Examples of the tin compound include: tin tetrachloride, butyltin trichloride, dibutyltin dichloride, dioctyltin dichloride, tributyltin chloride, triphenyltin chloride, diphenyldibutyltin, triphenyltin ethoxide, diphenyldimethyltin, ditolyltin chloride, diphenyltin dioctanoate, divinyldiethyltin, tetrabenzyltin, dibutyltin distearate, tetraallyltin, and p-tributyltin styrene. Each of these may be used singly, or two or more of these may be used in combination.

The tin-atom content in the tin-modified BR is 50 ppm or more, and desirably 60 ppm or more. If the content is less than 50 ppm, dispersion of carbon black in the tin-modified BR is not sufficiently promoted and tan δ increases. The tin-atom content is 3000 ppm or less, desirably 2500 ppm or less, and more desirably 250 ppm or less. If the content is more than 3000 ppm, the resulting kneaded product tends not to come together easily and thus not to provide a uniform edge profile, so that the extrusion processability of the kneaded product may worsen.

The molecular weight distribution (Mw/Mn) of the tin-modified BR is 2 or less, and desirably 1.5 or less. It is undesirable that the Mw/Mn is more than 2 because, in such case, dispersibility of carbon black deteriorates and tan δ increases.

In the present invention, a number average molecular weight (Mn) and a weight average molecular weight (Mw) are determined relative to polystyrene standards by gel permeation chromatography (GPC).

The vinyl bond content in the tin-modified BR is 5% by mass or more, and desirably 7% by mass or more. If the vinyl bond content is less than 5% by mass, it is difficult to form (produce) the tin-modified BR by polymerization. The vinyl bond content is 50% by mass or less, and desirably 20% by mass or less. If the vinyl bond content is more than 50% by mass, carbon black tends not to be sufficiently dispersed and tensile strength tends to weaken.

The amount of the S-modified BR and/or the tin-modified BR in 100% by mass of the rubber component is 10% by mass or more, desirably 12% by mass or more, and more desirably 15% by mass or more. If the amount thereof is less than 10% by mass, low-exothermic property is not expected to be sufficiently exerted. The amount of the S-modified BR and/or the tin-modified BR is 30% by mass or less, desirably 28% by mass or less, and more desirably 25% by mass or less. If the amount thereof is more than 30% by mass, breaking strength of rubber tends to be at an insufficient level. Here, the amount of the S-modified BR and/or the tin-modified BR is the total amount of the S-modified BR and the tin-modified BR.

In the present invention, a modified SBR is used as a subcomponent (b). The modified SBR can inhibit reversion and reduce tan δ.

Examples of the modified SBR include modified emulsion polymerization-SBRs (Modified E-SBRs) and modified solution polymerization-SBRs (Modified S-SBR). It is generally easier to control a molecular weight in solution polymerization. On the other hand, in the case of emulsion polymerization, it is difficult to control a molecular weight and tan δ tends to increase.

The bound-styrene content in the modified SBR is 21% by mass or less, desirably 15% by mass or less, and more desirably 13% by mass or less, from the viewpoint of reduction in tan δ. The bound-styrene content in the modified SBR is desirably 5% by mass or more, more desirably 7% by mass or more, and still more desirably 8% by mass or more, from the viewpoint of inhibition of reversion and enhancement in E* (Hs).

The modified SBRs are desirably those having a low bound-styrene content, such as HPR340 (produced by JSR Corp.).

The styrene content is determined by $^1$-H-NMR measurement.

Desirably used as the modified SBR are those coupled with tin, silicon or the like. Examples of a coupling method of the modified SBR include a method in which an alkaline metal (such as Li) or an alkaline-earth metal (such as Mg) at the chain end of the modified SBR, for example, is allowed to react with a tin halide, a silicon halide or the like according to usual techniques.

The modified SBR is a (co)polymer obtained by (co)polymerizing conjugated diolefins alone or (co)polymerizing a conjugated diolefin and an aromatic vinyl compound. It desirably has a primary amino group or an alkoxysilyl group. The primary amino group may be coupled to any of a polymerization initiation end, a polymerization termination end, a main chain of polymers, or a side chain of polymers. The primary amino group is, however, desirably introduced into either the polymerization initiation end or the polymerization termination end because hysteresis loss can be improved by reducing energy loss from the ends of polymers.

Particularly suitably used among the modified solution polymerization-SBRs (Modified S-SBR) is a styrene-butadiene rubber (SBR) modified by the compound represented by the formula (1). This is easy to control on a molecular weight of polymer, and it is therefore possible to reduce an amount of low-molecular-weight materials which increase tan δ. In addition, it is possible to strengthen a bond between silica and a polymer chain so as to reduce tan δ at 30° C. to 60° C., thereby leading to improvement in fuel economy. For modifying the SBR by the compound represented by the formula (1), the same modification methods as those mentioned above for the butadiene rubber may be used.

The weight average molecular weight (Mw) of the modified SBR is desirably 1 million or more, and more desirably 1.2 million or more in view of the capability of obtaining sufficient breaking properties. The Mw of the modified SBR is desirably 2 million or less, and more desirably 1.8 million or less because of the capability of adjusting rubber viscosity to facilitate a kneading process of the rubber.

The amount of the modified SBR in 100% by mass of the rubber component is 10% by mass or more, desirably 12% by mass or more, and more desirably 15% by mass or more from the viewpoint of excellent handling responsiveness and grip properties such as braking performance. The amount of the modified SBR is 40% by mass or less, desirably 38% by mass or less, and more desirably 35% by mass or less from the viewpoints of inhibiting heat generation with combined use of other rubber materials such as a modified BR and of ensuring proper breaking strength with use of a NR.

In the present invention, a diene rubber other than the S-modified BR, the tin-modified BR, and the modified SBR (subcomponents (a) and (b)) is used as a subcomponent (c).

Examples of the diene rubber include natural rubbers (NRs), epoxydized natural rubbers (ENRs), butadiene rubber (BR), styrene-butadiene rubber (SBR), isoprene rubber (IR), ethylene-propylene-diene rubber (EPDM), butyl rubber (IIR), halogenated butyl rubbers (X-IIRs), chloroprene rubber (CR), acrylonitrile-butadiene rubber (NBR), and halogenated copolymers of an isomonoolefin and a paraalkylstyrene. Particularly, the NRs, the IR and the ENRs are desirably used from the viewpoint of ensuring proper breaking strength and processability.

The NRs are not particularly limited. For example, natural rubbers generally used in the tire industry, such as SIR20, RSS#3, and TSR20, may be used. Also with respect to the IR and the ENRs, those generally used in the tire industry may be used.

The amount of the diene rubber (subcomponent (c)) is 20% by mass or more, desirably 25% by mass or more, and more desirably 30% by mass or more, in 100% by mass of the rubber component. If the amount thereof is less than 20% by mass, breaking strength tends to decrease. The amount of the diene rubber is 80% by mass or less, desirably 75% by mass or less, and more desirably 70% by mass or less. If the amount thereof is more than 80% by mass, there are tendencies toward decrease in E* and toward worsening tan δ owing to reversion.

The rubber composition of the present invention contains silica as a component (d). Containing silica makes it possible to improve breaking strength and to reduce tan δ. The silica is not particularly limited. Examples thereof include dry silica (silicic anhydride) and wet silica (hydrous silicic acid). The wet silica is desirable because it has more silanol groups.

The nitrogen adsorption specific surface area ($N_2SA$) of the silica is desirably 40 $m^2/g$ or more, and more desirably 45 $m^2/g$ or more. If the $N_2SA$ is less than 40$m^2/g$, breaking strength tends to decrease. The $N_2SA$ of the silica is desirably 250 $m^2/g$ or less, and more desirably 200 $m^2/g$ or less. If the $N_2SA$ is more than 250 $m^2/g$, the low-exothermic property deteriorates. The nitrogen adsorption specific surface area of the silica is determined by the BET method in accordance with ASTM D3037-81.

The amount of the silica is 7 parts by mass or more, desirably 9 parts by mass or more, more desirably 12 parts by mass or more, and still more desirably 15 parts by mass or more, per 100 parts by mass of the rubber component. If the amount thereof is less than 7 parts by mass, effects of blending the silica cannot be sufficiently exerted and the breaking strength decreases. The amount of the silica is 50 parts by mass or less, desirably 45 parts by mass or less, and more desirably 40 parts by mass or less, per 100 parts by mass of the rubber component. If the amount thereof is more than 50 parts by mass, the low-exothermic property deteriorates.

The rubber composition of the present invention desirably contains a silane coupling agent. Any silane coupling agents conventionally used in combination with silica in the rubber industry can be used. Examples thereof include: sulfide-type silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-triethoxysilylpropyl)trisulfide, bis(2-triethoxysilylethyl)trisulfide, bis(4-triethoxysilylbutyl)trisulfide, bis(3-trimethoxysilylpropyl)trisulfide, bis(2-trimethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 2-trimethoxysilylethyl-N,N-dimethylthiocarbamoyl tetrasulfide, 3-trimethoxysilylpropylbenzothiazolyl tetrasulfide, 3-triethoxysilylpropylbenzothiazol tetrasulfide, 3-triethoxysilylpropylmethacrylate monosulfide, and 3-trimethoxysilylpropylmethacrylate monosulfide; mercapto-type silane coupling agents such as 3-mercaptopropyl trimethoxysilane, 3-mercaptopropyl triethoxysilane, 2-mercaptoethyl trimethoxysilane, and 2-mercaptoethyl triethoxysilane; vinyl-type silane coupling agents such as vinyl triethoxysilane and vinyl trimethoxysilane; glycidoxy-type silane coupling agents such as γ-glycidoxypropyl triethoxysilane, γ-glycidoxypropyl trimethoxysilane, γ-glycidoxypropylmethyldiethoxysilane, and γ-glycidoxypropyl methyldimethoxysilane; nitro-type silane coupling agents such as 3-nitropropyl trimethoxysilane and 3-nitropropyl triethoxysilane; and chloro-type silane coupling agents such as 3-chloropropyl trimethoxysilane, 3-chloropropyl triethoxysilane, 2-chloroethyl trimethoxysilane, and 2-chloroethyl triethoxysilane. As the trade name thereof, Si69, Si75, and Si363 (each produced by Degussa AG), NXT, NXT-LV, NXT-ULV, and NXT-Z (each produced by GE), and the like are listed. Desirable among these is bis(3-triethoxysilylpropyl) disulfide. Each of these silane coupling agents may be used singly or two or more of these may be used in combination.

The amount of the silane coupling agent is desirably 5 parts by mass or more, and more desirably 8 parts by mass or more, per 100 parts by mass of the silica. If the amount thereof is less than 5 parts by mass, breaking strength tends to decrease greatly. The amount of the silane coupling agent is desirably 15 parts by mass or less, and more desirably 10 parts by mass or less, per 100 parts by mass of the silica. If the amount thereof is more than 15 parts by mass, effects of adding the silane coupling agent, such as increase in breaking strength and decrease in rolling resistance, tend not to be exerted.

The rubber composition of the present invention may contain carbon black. The carbon black improves rubber strength. Examples of the carbon black include GPF, HAF, ISAF and SAF. It is desirable to use carbon black with N550 or N660 in the ASTM standard or less reinforcing grade than N660.

In the case of using the carbon black, the nitrogen adsorption specific surface area ($N_2SA$) of the carbon black is desirably 20 $m^2/g$ or more, and more desirably 30 $m^2/g$ or more. If the $N_2SA$ is less than 20 $m^2/g$, reinforcing property provided by the carbon black tends to be insufficient. The $N_2SA$ of the carbon black is desirably 50 $m^2/g$ or less, and more desirably 45 $m^2/g$ or less. If the $N_2SA$ is more than 50 $m^2/g$, tan δ tends to increase. The nitrogen adsorption specific surface area of the carbon black is determined by the method A in JIS K 6217.

The amount of the carbon black is desirably 5 parts by mass or more, and more desirably 10 parts by mass or more, per 100 parts by mass of the rubber component. If the amount thereof is less than 5 parts by mass, reinforcing property provided by the carbon black tends to be insufficient. The amount of the carbon black is desirably 50 parts by mass or less, and more desirably 40 parts by mass or less, per 100 parts by mass of the rubber component. If the amount thereof is more than 50 parts by mass, much heat tends to be generated.

In the case of blending the carbon black, the total amount of the silica (component (d)) and the carbon black is desirably 20 parts by mass or more, and more desirably 30 parts by mass or more, per 100 parts by mass of the rubber component. At the same time, the total amount thereof is desirably 70 parts by mass or less, and more desirably 50 parts by mass or less. If the total amount thereof is in the above range, the resulting products have advantages in breaking strength, sheet processability, tan δ and Hs.

In addition to the above-listed components, the rubber composition of the present invention may optionally contain a compounding ingredient commonly used in production of rubber compositions. Examples of the compounding ingredient include: reinforcing fillers such as clay; zinc oxide; stearic acid; various antiaging agents; oils such as aromatic oils; waxes; vulcanizing agents; and vulcanization accelerators.

Examples of the vulcanizing agent include sulfur and sulfur compounds, and insoluble sulfur treated by oil is suitably used, for instance. Examples of the vulcanization accelerator include: N-tert-butyl-2-benzothiazolylsulfenamide (TBBS), N-cyclohexyl-2-benzothiazolylsulfenamide (CBS), N,N'-dicyclohexyl-2-benzothiazolylsulfenamide (DZ), mercaptobenzothiazol (MBT), dibenzothiazolyldisulfide (MBTS), and diphenylguanidine (DPG). Particularly, sulfenamide-type vulcanization accelerators such as TBBS, CBS and DZ are desirably used. This is because they are excellent in vulcanization characteristics, and because, with respect to physical properties of rubber after vulcanization, they contribute to excellent low-exothermic property and great improvement of mechanical hardness. In particular, it is desirable to use CBS and DPG together.

The rubber composition of the present invention may be produced by a known method. For example, the rubber composition may be produced by kneading the above ingredients with a rubber kneader such as an open roll mill or a Banbury mixer, and then vulcanizing the mixture.

The rubber composition of the present invention can be suitably used as rubber compositions for a base tread, for a cushion (a breaker cushion), for coating a carcass, and for a tie gum of a tire. The base tread corresponds to an inner-layer portion of a multi-layer tread. For example, in the case of a two-layer tread (which has a surface layer (a cap tread) and an inner layer), the base tread is the inner layer. The cushion (breaker cushion) is a layer disposed between an edge portion of a breaker and a carcass. The carcass is a component including a carcass cord and a carcass cord-coating rubber layer, and the above rubber composition may be used for the carcass cord-coating rubber layer. The tie gum is a buffering rubber layer inserted between a carcass cord-coating rubber layer and an inner liner (which includes butyl type rubber in many cases).

For applying the rubber composition to the carcass, for example, an adhesive resin (Sumikanol 620 and 507A) may be further added to the formulation of the rubber composition for a base tread, and an antiaging agent may be changed to another. For applying the rubber composition to the tie gum or the cushion, an antiaging agent in the formulation of the rubber composition for a base tread may be changed to another, for example.

The pneumatic tire of the present invention can be produced by a usual method with use of the above rubber composition. More specifically, the rubber composition of the present invention prepared by mixing the aforementioned compounding ingredients according to necessity is extruded and processed into a shape of a base tread, a cushion, a carcass cord-coating rubber layer, or a tie gum at an unvulcanized stage and then, laminated with other tire components on a tire molding machine and molded in a usual manner to obtain an unvulcanized tire. Then, the unvulcanized tire is subjected to heating and pressing in a vulcanizer to obtain the tire of the present invention.

The tire of the present invention is suitably used as tires for passenger vehicles, buses, trucks, and the like.

EXAMPLES

The present invention will be more specifically described based on examples, but the present invention is not limited to these examples.

In the following, respective chemical agents used in Examples and Comparative Examples are listed.

Tin-modified BR: BR1250H produced by ZEON Corp. (formed by polymerization with lithium as an initiator, vinyl bond content: 10 to 13% by mass, Mw/Mn: 1.5, tin atom content: 250 ppm)

S-modified BR: modified butadiene rubber produced by Sumitomo Chemical Co., Ltd., (vinyl content: 15% by mass, $R^1$, $R^2$ and $R^3$=—$OCH_3$; $R^4$ and $R^5$=—$CH_2CH_3$; n=3)

BR: BR150B produced by Ube Industries, Ltd. (high-cis butadiene rubber, not modified)

SPB-containing BR: VCR617 produced by Ube Industries, Ltd. (high-cis butadiene rubber, 1,2-syndiotactic polybutadiene crystal (SPB) dispersion, SPB content: 17% by mass, not modified)

Modified SBR (HPR340): HPR340 produced by JSR Corp. (modified S-SBR, bound-styrene content: 10% bymass, terminated with an alkoxysilane (i.e. modified by a compound represented by the formula (1)))

Modified SBR (HPR350): HPR350 produced by JSR Corp. (modified S-SBR, bound-styrene content: 21% by mass, terminated with an alkoxysilane (i.e. modified by a compound represented by the formula (1)))

Modified SBR (HPR355): HPR355 produced by JSR Corp. (modified S-SBR, bound-styrene content: 27% bymass, terminated with an alkoxysilane ($R^1$, $R^2$ and $R^3$=—$OCH_3$; $R^4$ and $R^5$ =H; n=3))

SBR: Nipol1502 produced by ZEON Corp. (E-SBR, bound-styrene content: 23.5% by mass, not modified)

NR: TSR20

Carbon black (N660) : SEAST V produced by Tokai Carbon Co., Ltd. (N660, $N_2SA$: 27 $m^2/g$)

Carbon black (N550): SHOBLACK N550 produced by Cabot Japan K.K. ($N_2SA$: 41 $m^2/g$)

Silica (Z115Gr) : Z115Gr produced by Rhodia ($N_2SA$: 112 $m^2/g$)

Silica (VN3) : Nipsil VN3 produced by Nihon Silica ($N_2SA$: 175 $m^2/g$)

Silane coupling agent: Si75 produced by Degussa-Huels AG (bis(3-triethoxysilylpropyl)disulfide)

Zinc oxide: Ginrei R produced by TOHO ZINC CO., LTD.

Stearic acid: "TSUBAKI" produced by NOF Corp.

Antiaging agent: Noclac 6C produced by OUCHI SHINKO CHEMICAL INDUSTRIAL CO., LTD. (N-(1,3-dimethylbutyl)-N'-phenyl-p-phenylenediamine)

Wax: Sunnoc wax produced by OUCHI SHINKO CHEMICAL INDUSTRIAL CO., LTD.

Aromatic oil: Process X-140 produced by JAPAN ENERGY CORP.

Insoluble sulfur: SEIMI sulfur produced by NIPPON KANRYU INDUSTRY CO., LTD. (carbon disulfide-insoluble content: 60%, oil content: 10%)

Vulcanization accelerator CBS: NOCCELER CZ produced by OUCHI SHINKO CHEMICAL INDUSTRIAL CO., LTD.
(N-cyclohexyl-2-benzothiazolylsulfenamide)

Vulcanization accelerator DPG: NOCCELER D produced by OUCHI SHINKO CHEMICAL INDUSTRIAL CO., LTD.
(N,N'-diphenylguanidine)

Examples 1 to 10 and Comparative Examples 1 to 8

According to the respective formulations shown in Tables 1 and 2, chemical agents other than sulfur and a vulcanization accelerator were kneaded by a Banbury mixer at a temperature of at most 165° C. for five minutes to provide a kneaded product. To the resulting kneaded product were added sulfur and a vulcanization accelerator and then kneaded with an open roll mill at a temperature of at most 97° C. for three minutes to provide an unvulcanized rubber composition. Thereafter, the resulting unvulcanized rubber composition was rolled into a sheet shape and then press-vulcanized in a mould at 170° C. for 12 minutes to provide a vulcanized rubber composition (a vulcanized rubber sheet).

The vulcanized rubber sheets obtained above were individually evaluated based on the following criteria. Tables 1 and 2 illustrate the results.

(Viscoelasticity Test)

The vulcanized rubber sheet was prepared into a predetermined sample shape. Then, $E^*$ and $\tan \delta$ of the vulcanized rubber sheet at 30° C. were measured by a viscoelasticity spectrometer (produced by Iwamoto Seisakusho Co., Ltd.) under conditions of: 10 Hz in frequency; 10% in initial strain; and 2% in dynamic strain. The larger $E^*$ value indicates the higher rigidity and higher hardness, and the smaller $\tan \delta$ value means the more excellent low-exothermic property.

(Tensile Test)

A No. 3 dumbbell specimen prepared from the vulcanized rubber sheet was subjected to a tensile test in accordance with JIS K 6251 "Rubber, vulcanized or thermoplastic—Determination of tensile stress—strain properties" and elongation at break (EB) was measured. The larger EB value means the more excellent rubber strength.

(Crack Growth Resistance)

A vulcanized rubber specimen in a predetermined size was cut out from the vulcanized rubber composition. Thereafter, the vulcanized rubber specimen was bent repeatedly 120,000 times, and then length (mm) of crack growth was measured in accordance with JIS K 6260 "Testing method of flex cracking and crack growth for rubber, vulcanized or thermoplastic (De Mattia)". The index value of crack growth resistance in Comparative Example 6 was regarded as 100, and the length of crack growth in each of the vulcanized compositions was expressed as an index value calculated by the following equation. The larger index value of crack growth resistance means the less growth of a crack and the more excellent crack growth resistance.

(Index value of crack growth resistance)=(Length of crack growth in Comparative Example 6)/(Length of crack growth in each of the vulcanized compositions)×100

TABLE 1

| | | | Styrene content (%) | Modified/ Non-modified | Examples | | | | | Comparative Examples | | |
|---|---|---|---|---|---|---|---|---|---|---|---|---|
| | | | | | 1 | 2 | 3 | 4 | 5 | 1 | 2 | 3 |
| Formulation (parts by mass) | (a) | Tin-modified BR | | Sn-modified | 20 | 20 | — | 20 | 30 | 20 | 20 | — |
| | | S-modified BR | | Formula (1)-modified | — | — | 20 | — | — | — | — | — |
| | | BR (high-cis) | | Non-modified | — | — | — | — | — | — | — | 20 |
| | | SPB-containing BR | | Non-modified | — | — | — | — | — | — | — | — |
| | (b) | Modified SBR (HPR340) | 10 | Formula (1)-modified | 20 | — | 20 | 40 | 20 | — | — | 20 |
| | | Modified SBR (HPR350) | 21 | Formula (1)-modified | — | 20 | — | — | — | — | — | — |
| | | Modified SBR (HPR355) | 27 | Formula (1)-modified | — | — | — | — | — | 20 | — | — |
| | | SBR (emulsion) | 23.5 | Non-modified | — | — | — | — | — | — | 20 | — |
| | (c) | NR | | Non-modified | 60 | 60 | 60 | 40 | 50 | 60 | 60 | 60 |
| | | Carbon black (N660) | | | 23 | 23 | 23 | 23 | 23 | 23 | 23 | 23 |
| | | Carbon black (N550) | | | — | — | — | — | — | — | — | — |
| | (d) | Silica (Z115Gr) | | | 27 | 27 | 27 | 27 | 27 | 27 | 27 | 27 |
| | | Silica (VN3) | | | — | — | — | — | — | — | — | — |
| | | Silane coupling agent | | | 1.89 | 1.89 | 1.89 | 1.89 | 1.89 | 1.89 | 1.89 | 1.89 |
| | | Zinc oxide | | | 4 | 4 | 4 | 4 | 4 | 4 | 4 | 4 |
| | | Stearic acid | | | 2 | 2 | 2 | 2 | 2 | 2 | 2 | 2 |
| | | Antiaging agent | | | 2 | 2 | 2 | 2 | 2 | 2 | 2 | 2 |
| | | Wax | | | 1 | 1 | 1 | 1 | 1 | 1 | 1 | 1 |
| | | Aromatic oil | | | 3 | 3 | 3 | 3 | 3 | 3 | 3 | 3 |
| | | Insoluble sulfur | | | 3 | 3 | 3 | 3 | 3 | 3 | 3 | 3 |
| | | Vulcanization accelerator CBS | | | 0.7 | 0.7 | 0.7 | 0.7 | 0.7 | 0.7 | 0.7 | 0.7 |
| | | Vulcanization accelerator DPG | | | 0.7 | 0.7 | 0.7 | 0.7 | 0.7 | 0.7 | 0.7 | 0.7 |
| Evaluation | | $E^*$ 30° C. | | | 3.5 | 3.7 | 3.4 | 3.9 | 3.7 | 4.2 | 4.4 | 3.7 |
| | | $\tan \delta$ 30° C. | | | 0.105 | 0.11 | 0.109 | 0.099 | 0.112 | 0.122 | 0.17 | 0.129 |
| | | Elongation at break EB % | | | 380 | 410 | 360 | 310 | 330 | 380 | 390 | 390 |
| | | Index value of crack growth resistance | | | 130 | 125 | 125 | 120 | 130 | 115 | 110 | 140 |

TABLE 2

| | | | Styrene content (%) | Modified/ Non-modified | Examples | | | | |
|---|---|---|---|---|---|---|---|---|---|
| | | | | | 6 | 7 | 8 | 9 | 10 |
| Formulation (parts by mass) | (a) | Tin-modified BR | | Sn-modified | 10 | 30 | 30 | 20 | 20 |
| | | S-modified BR | | Formula (1)-modified | — | — | — | — | — |
| | | BR (high-cis) | | Non-modified | — | — | — | — | — |
| | | SPB-containing BR | | Non-modified | — | — | — | — | — |

TABLE 2-continued

|  |  |  |  |  |  |  |  |  |  |
|---|---|---|---|---|---|---|---|---|---|
|  |  | (b) | Modified SBR (HPR340) | 10 | Formula (1)-modified | 10 | 10 | 40 | 20 | 20 |
|  |  |  | Modified SBR (HPR350) | 21 | Formula (1)-modified | — | — | — | — | — |
|  |  |  | Modified SBR (HPR355) | 27 | Formula (1)-modified | — | — | — | — | — |
|  |  |  | SBR (emulsion) | 23.5 | Non-modified | — | — | — | — | — |
|  |  | (c) | NR |  | Non-modified | 80 | 60 | 30 | 60 | 60 |
|  |  |  | Carbon black (N660) |  |  | 23 | 23 | 23 | 40 | 2 |
|  |  |  | Carbon black (N550) |  |  | — | — | — | — | — |
|  |  | (d) | Silica (Z115Gr) |  |  | 27 | 27 | 27 | 10 | 48 |
|  |  |  | Silica (VN3) |  |  | — | — | — | — | — |
|  |  |  | Silane coupling agent |  |  | 1.89 | 1.89 | 1.89 | 0.07 | 3.36 |
|  |  |  | Zinc oxide |  |  | 4 | 4 | 4 | 4 | 4 |
|  |  |  | Stearic acid |  |  | 2 | 2 | 2 | 2 | 2 |
|  |  |  | Antiaging agent |  |  | 2 | 2 | 2 | 2 | 2 |
|  |  |  | Wax |  |  | 1 | 1 | 1 | 1 | 1 |
|  |  |  | Aromatic oil |  |  | 3 | 3 | 3 | 3 | 3 |
|  |  |  | Insoluble sulfur |  |  | 3 | 3 | 3 | 3 | 3 |
|  |  |  | Vulcanization accelerator CBS |  |  | 0.7 | 0.7 | 0.7 | 0.7 | 0.7 |
|  |  |  | Vulcanization accelerator DPG |  |  | 0.7 | 0.7 | 0.7 | 0.7 | 0.7 |
| Evaluation |  |  | E* 30° C. |  |  | 3.3 | 3.4 | 3.7 | 3.3 | 4.0 |
|  |  |  | tan δ 30° C. |  |  | 0.127 | 0.11 | 0.097 | 0.095 | 0.133 |
|  |  |  | Elongation at break EB % |  |  | 480 | 390 | 270 | 300 | 480 |
|  |  |  | Index value of crack growth resistance |  |  | 70 | 120 | 120 | 115 | 120 |

|  |  |  | Comparative Examples |  |  |  |  |
|---|---|---|---|---|---|---|---|
|  |  |  | 4 | 5 | 6 | 7 | 8 |
| Formulation (parts by mass) | (a) | Tin-modified BR | 40 | 0 | 20 | 20 | 45 |
|  |  | S-modified BR | — | — | — | — | — |
|  |  | BR (high-cis) | — | — | — | — | — |
|  |  | SPB-containing BR | — | — | — | — | — |
|  | (b) | Modified SBR (HPR340) | 0 | 40 | 20 | 20 | 40 |
|  |  | Modified SBR (HPR350) | — | — | — | — | — |
|  |  | Modified SBR (HPR355) | — | — | — | — | — |
|  |  | SBR (emulsion) | — | — | — | — | — |
|  | (c) | NR | 60 | 60 | 60 | 60 | 15 |
|  |  | Carbon black (N660) | 23 | 23 | 50 | 2 | 23 |
|  |  | Carbon black (N550) | — | — | — | — | — |
|  | (d) | Silica (Z115Gr) | 27 | 27 | 0 | 55 | 27 |
|  |  | Silica (VN3) | — | — | — | — | — |
|  |  | Silane coupling agent | 1.89 | 1.89 | — | 3.85 | 1.89 |
|  |  | Zinc oxide | 4 | 4 | 4 | 4 | 4 |
|  |  | Stearic acid | 2 | 2 | 2 | 2 | 2 |
|  |  | Antiaging agent | 2 | 2 | 2 | 2 | 2 |
|  |  | Wax | 1 | 1 | 1 | 1 | 1 |
|  |  | Aromatic oil | 3 | 3 | 3 | 3 | 3 |
|  |  | Insoluble sulfur | 3 | 3 | 3 | 3 | 3 |
|  |  | Vulcanization accelerator CBS | 0.7 | 0.7 | 0.7 | 0.7 | 0.7 |
|  |  | Vulcanization accelerator DPG | 0.7 | 0.7 | 0.7 | 0.7 | 0.7 |
| Evaluation |  | E* 30° C. | 2.8 | 4.5 | 3.9 | 4.8 | 4.2 |
|  |  | tan δ 30° C. | 0.11 | 0.119 | 0.107 | 0.15 | 0.116 |
|  |  | Elongation at break EB % | 390 | 350 | 220 | 460 | 260 |
|  |  | Index value of crack growth resistance | 140 | 50 | 100 | 130 | 110 |

In Examples, the obtained rubber compositions showed high breaking strength and excellent low-exothermic property as well as excellent crack growth resistance. On the other hand, in Comparative Examples 1 and 2 in which the modified SBR (HPR355, styrene content: 27%) or the non-modified SBR was used instead of the modified SBR (HPR340, styrene content: 10%) in Example 1, the low-exothermic properties and the crack growth resistances deteriorated. In Comparative Example 3 in which the non-modified BR was used instead of the tin-modified BR in Example 1, the low-exothermic property deteriorated.

The hardness decreased in Comparative Example 4 in which any modified SBR was not blended; the crack growth resistance deteriorated in Comparative Example 5 in which any tin-modified BR was not blended; the elongation at break and the crack growth resistance deteriorated in Comparative Example 6 with no silica blended; the low-exothermic property deteriorated in Comparative Example 7 with a larger amount of the silica blended; and the elongation at break decreased in Comparative Example 8 with a smaller amount of the NR blended.

The invention claimed is:

1. A pneumatic tire comprising:
   at least one of a base tread, a cushion, and a tie gum that are prepared using a rubber composition comprising:
   a rubber component which contains
   (a) 10 to 30% by mass in 100% by mass of the rubber component of at least one of a butadiene rubber modified by a compound represented by the formula (1):

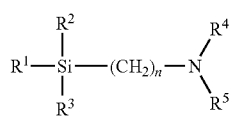 (1)

wherein $R^1$, $R^2$ and $R^3$ are the same or different and independently represent an alkyl group, an alkoxy group, a silyloxy group, an acetal group, a carboxyl group, a mercapto group, or a derivative thereof; $R^4$ and $R^5$ are the same or different and independently represent a hydrogen atom or an alkyl group; and n represents an integer, and a tin-modified polybutadiene rubber resulting from polymerization with a lithium initiator and having a tin atom content of 50 to 3000 ppm, a vinyl-bond content of 5 to 50% by mass, and a molecular weight distribution (Mw/Mn) of 2 or less;

(b) 10 to 40% by mass of a modified styrene-butadiene rubber having a bound-styrene content of 21% by mass or less; and (c) 20 to 80% by mass of a diene rubber other than (a) and (b);

(d) 7 to 50 parts by mass of silica per 100 parts by mass of the rubber component; and (e) 5 to 50 parts by mass of carbon black per 100 parts by mass of the rubber component, said carbon black having a nitrogen adsorption specific surface area of 20 to 50 $m^2/g$.

2. The pneumatic tire according to claim 1,
wherein the bound-styrene content in the modified styrene-butadiene rubber is 15% by mass or less.

3. The pneumatic tire according to claim 1,
wherein the modified styrene-butadiene rubber is produced by modification with the compound represented by the formula (1).

4. The pneumatic tire according to claim 1,
wherein the diene rubber is at least one selected from the group consisting of natural rubbers, isoprene rubbers, and epoxydized natural rubbers.

5. The pneumatic tire according to claim 1,
wherein at least one of $R^1$, $R^2$ and $R^3$ are the same or different and independently represent the alkoxy group; $R^4$ and $R^5$ are the same or different and independently represent the alkyl group; and n represents 1 to 5.

6. The pneumatic tire according to claim 1,
wherein the total amount of the silica and carbon black is 20 to 70 parts by mass per 100 parts by mass of the rubber component.

* * * * *